United States Patent
Prokhorov

(10) Patent No.: US 12,173,759 B2
(45) Date of Patent: Dec. 24, 2024

(54) CLUTCH ASSEMBLY WITH TWO HYDRAULICALLY ACTUATED CLUTCH DEVICES

(71) Applicant: Schaeffler Technologies AG & Co. KG, Herzogenaurach (DE)

(72) Inventor: Kirill Prokhorov, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/552,948

(22) PCT Filed: Mar. 8, 2022

(86) PCT No.: PCT/DE2022/100187
§ 371 (c)(1),
(2) Date: Sep. 28, 2023

(87) PCT Pub. No.: WO2022/214123
PCT Pub. Date: Oct. 13, 2022

(65) Prior Publication Data
US 2024/0167521 A1    May 23, 2024

(30) Foreign Application Priority Data
Apr. 7, 2021   (DE) .......................... 102021108593.4

(51) Int. Cl.
*F16D 25/10*   (2006.01)
*F16D 25/08*   (2006.01)

(52) U.S. Cl.
CPC ........... *F16D 25/10* (2013.01); *F16D 25/083* (2013.01); *F16D 2300/12* (2013.01)

(58) Field of Classification Search
CPC ...... F16D 25/10; F16D 25/087; F16D 25/083; F16D 2001/103; F16D 25/08; F16B 21/18
See application file for complete search history.

(56) References Cited

U.S. PATENT DOCUMENTS

| | | | |
|---|---|---|---|
| 6,997,298 B2 * | 2/2006 | Janson | F16D 13/385 192/48.91 |
| 7,392,890 B2 * | 7/2008 | Agner | F16D 25/0638 192/48.8 |

(Continued)

FOREIGN PATENT DOCUMENTS

| | | | |
|---|---|---|---|
| CN | 207128609 U | * 3/2018 | ............. B60K 6/387 |
| CN | 111828498 | 10/2020 | |

(Continued)

OTHER PUBLICATIONS

Erik Schneider, Frank Fickl, Bernd Cebulski and Jens Liebold, ATZ Magazine, vol. 113, pp. 360-365, "Hochintegrativ und Flexibel Elektrische Antriebseinheit für E-Fahrzeuge" [Highly integrative and flexible electric drive unit for e-vehicles], May 2011.

*Primary Examiner* — Stacey A Fluhart
(74) *Attorney, Agent, or Firm* — Volpe Koenig

(57) ABSTRACT

A hydraulic assembly for an electrically operatable multi-gear axle drive train of a motor vehicle, including first and second clutch devices for actuating at least one gear selection device of the electrically operatable axle drive train and a central release mechanism having a first central release mechanism piston that is movable relative to a central release mechanism housing, rotationally fixed to a drive train housing, in a translational manner, and a second central release mechanism piston that is movable relative to the central release mechanism housing, rotationally fixed to the drive train housing, in a translational manner. The radially outer lateral surface of the central release mechanism housing has a groove into which a shell-like toothing element with an outer toothing is inserted and secured axially and for torque-transmission. The outer toothing engages into corresponding toothing rotationally fixed to the drive train housing.

20 Claims, 4 Drawing Sheets

(56) References Cited

U.S. PATENT DOCUMENTS

| | | | |
|---|---|---|---|
| 10,619,701 B2* | 4/2020 | Maguire | F16D 25/082 |
| 2002/0060118 A1* | 5/2002 | Beneton | F16D 25/087 |
| | | | 192/55.61 |
| 2003/0066728 A1* | 4/2003 | Hirt | F16H 3/089 |
| | | | 192/85.48 |
| 2011/0114435 A1* | 5/2011 | Noehl | F16D 25/082 |
| | | | 192/48.1 |

FOREIGN PATENT DOCUMENTS

| | | | | |
|---|---|---|---|---|
| DE | 102009030975 | | 1/2010 | |
| DE | 102012210523 | | 1/2013 | |
| DE | 102019103771 | | 5/2020 | |
| DE | 102019117109 | | 12/2020 | |
| DE | 102019133283 | | 12/2020 | |
| FR | 3054866 | | 2/2018 | |
| FR | 3059065 | | 5/2018 | |
| FR | 3059065 | A1 * | 5/2018 | F16D 21/06 |
| FR | 3081948 | | 12/2019 | |
| WO | 2022056758 | | 3/2022 | |

* cited by examiner

CLUTCH ASSEMBLY WITH TWO HYDRAULICALLY ACTUATED CLUTCH DEVICES

CROSS-REFERENCE TO RELATED APPLICATIONS

This application is the U.S. National Phase of PCT Appln. No. PCT/DE2022/100187, filed Mar. 8, 2022, which claims priority from German Patent Application No. 10 2021 108 593.4, filed Apr. 7, 2021, the entire disclosures of which are incorporated by reference herein.

TECHNICAL FIELD

The present disclosure relates to a hydraulic assembly for an electrically operable, multi-gear axle drive train of a motor vehicle, comprising a first clutch device and a second clutch device for actuating at least one gear selection device of the electrically operable axle drive train, and a central release mechanism, with a first central release mechanism piston that can be moved relative to a central release mechanism housing, which is fixed in a non-rotatable manner to a drive train housing, in a translational manner, wherein a first pressure chamber is defined between the central release mechanism housing and the first central release mechanism piston, into which a hydraulic fluid can be introduced and pressurized in such a way that the first central release mechanism piston can be moved in a hydraulically effected manner in relation to the central release mechanism housing, and with a second central release mechanism piston that can be moved relative to the central release mechanism housing, which is fixed in a non-rotatable manner to the drive train housing, in a translational manner, wherein a second pressure chamber is defined between the central release mechanism housing and the second central release mechanism piston, into which the hydraulic fluid can be introduced and pressurized in such a way that the second central release mechanism piston can be moved in a hydraulically effected manner in relation to the central release mechanism housing.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the ATZ magazine, Volume 113, 05/2011, pages 360-365 by Erik Schneider, Frank Fickl, Bernd Cebulski and Jens Liebold with the title: "Hochintegrativ und Flexibel Elektrische Antriebseinheit für E-Fahrzeuge" [Highly integrative and flexible electric drive unit for e-vehicles], which is probably the closest prior art. This article describes a drive unit for an axle of a vehicle, which comprises an electric motor that is arranged to be concentric and coaxial with a bevel gear differential, wherein a shiftable 2-speed planetary gear set is arranged in the drive train between the electric motor and the bevel gear differential, which is also positioned to be coaxial to the electric motor or the bevel gear differential or spur gear differential. The drive unit is very compact and allows for a good compromise between climbing ability, acceleration, and energy consumption due to the shiftable 2-speed planetary gear set. Such drive units are also referred to as e-axles or electrically operable drive trains.

Such electrically operable drive trains with multi-gear shiftable transmissions generally require hydraulic devices for the shifting processes. Hydraulic devices such as central release mechanisms are used in such vehicles with multi-gear e-axles, which interact with clutches and/or brakes to change gears without interrupting traction.

SUMMARY

The object of the present disclosure is to provide a hydraulic assembly for an electrically operable, multi-gear axle drive train of a motor vehicle that can be produced inexpensively and allows for simple adaptability to different installation space situations in an axle drive train.

This object is achieved by a hydraulic assembly for an electrically operable, multi-gear axle drive train of a motor vehicle, comprising a first clutch device and a second clutch device for actuating at least one gear selection device of the electrically operable axle drive train, and a central release mechanism, with a first central release mechanism piston that can be moved relative to a central release mechanism housing, which is fixed in a non-rotatable manner to a drive train housing, in a translational manner, wherein a first pressure chamber is defined between the central release mechanism housing and the first central release mechanism piston, into which a hydraulic fluid can be introduced and pressurized in such a way that the first central release mechanism piston can be moved in a hydraulically effected manner in relation to the central release mechanism housing, and with a second central release mechanism piston that can be moved relative to the central release mechanism housing, which is fixed in a non-rotatable manner to the drive train housing, in a translational manner, wherein a second pressure chamber is defined between the central release mechanism housing and the second central release mechanism piston, into which the hydraulic fluid can be introduced and pressurized in such a way that the second central release mechanism piston can be moved in a hydraulically effected manner in relation to the central release mechanism housing, wherein the central release mechanism housing has a groove on the radially outer lateral surface thereof, into which a shell-like toothing element with an outer toothing is inserted and is connected in an axially secured and torque-transmitting manner, wherein the outer toothing engages in a corresponding toothing formed in a non-rotatable manner with respect to the drive train housing. \

This provides the advantage that the central release mechanism can be manufactured independently of a toothing geometry predetermined by the installation space of an axle drive train, and the adaptation to the installation space can be implemented via separate toothing elements that can be manufactured inexpensively. Therefore, a toothing geometry that is monolithically formed with the central release mechanism housing can be dispensed with. Furthermore, by means of a toothing element arranged in the groove, an axial and preferably also radial fixation of the central release mechanism housing relative to the drive train housing can preferably also be performed.

The groove can preferably be designed to be closed all the way around—that is to say without interruption—or else have interruptions in the circumferential direction, so that a groove that is segmented in the circumferential direction is realized. The groove preferably has a rectangular cross-section. Correspondingly, a toothing element preferably has a rectangular base body, from which the outer toothing extends radially outwards, wherein the base body engages in the rectangular groove with a precise fit. The groove can either be introduced directly into the central release mechanism housing during the manufacturing process of this, for example as part of an injection molding process or die-casting process, or it can be machined into the central release mechanism housing after the primary shaping process, for example.

The separate toothing element can in particular be fixed in the groove in a form-fitting, force-fitting and/or materially bonded manner.

First, the individual elements according to the disclosure are explained in the order in which they are named in the claims and particularly preferred embodiments of the subject matter of the disclosure are described below.

An electric axle drive train of a motor vehicle comprises an electric machine and a transmission arrangement, wherein the electric machine and the transmission arrangement form a structural unit. Provision can in particular be made for the electric machine and the transmission arrangement to be arranged in a common drive train housing. Alternatively, it would of course also be possible for the electric machine to have a motor housing and the transmission to have a transmission housing, wherein the structural unit can then be effected by fixing the transmission arrangement in relation to the electric machine. This structural unit is sometimes also referred to as an E-axle. The electric machine and transmission arrangement can also be housed in a drive train housing. The drive train housing is provided at least for receiving the electric machine and the transmission arrangement.

An electric machine serves to convert electrical energy into mechanical energy and/or vice versa, and generally comprises a stationary part referred to as a stator, stand, or armature, and a part referred to as a rotor or runner, and arranged to be movable relative to the stationary part. In the case of electric machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator. In connection with the disclosure, the electric machine can be designed as a radial or axial flux machine. The electric machine is intended in particular for use within an electrically operable drive train of a motor vehicle.

In particular, the electric machine is dimensioned such that vehicle speeds of more than 50 km/h, preferably more than 80 km/h, and in particular more than 100 km/h can be achieved. The electric machine particularly preferably has an output of more than 30 KW, preferably more than 50 KW, and in particular more than 70 KW. Furthermore, it is preferred that the electric machine provides speeds greater than 5,000 rpm, particularly preferably greater than 10,000 rpm, very particularly preferably greater than 12,500 rpm.

The transmission arrangement of the electric axle drive train can, in particular, be coupled to the electric machine, which is designed to generate a drive torque for the motor vehicle. The drive torque is particularly preferably a main drive torque, so that the motor vehicle is driven exclusively by the drive torque.

The transmission arrangement is particularly preferably designed to be multi-gear and shiftable.

The transmission arrangement can have a differential transmission. A differential transmission is a planetary gearing with one input and two outputs. It usually has the function of driving two vehicle wheels of a motor vehicle in such a way that they can turn at different speeds in curves, but with the same propulsive force.

The central release mechanism comprises a central release mechanism housing. The central release mechanism housing has the function of accommodating components of the central release mechanism, in particular the moving central release mechanism pistons, and protecting them from external mechanical or chemical influences. Furthermore, the central release mechanism housing has the function of allowing for a simple assembly and fixing of the central release mechanism within the drive train. The central release mechanism housing can preferably be formed from a plastic, a metallic material and/or a ceramic material. The central release mechanism housing can be made in one piece or in multiple pieces. According to the disclosure, the central release mechanism housing has a groove on the radially outer lateral surface thereof, into which a shell-like toothing element with an outer toothing is inserted and is connected in an axially secured and torque-transmitting manner.

The central release mechanism also has a central release mechanism piston. The central release mechanism piston has the function of converting hydraulic pressurization into a linear displacement of the central release mechanism piston, wherein the effect of which is that, for example, a clutch system can be transferred from an engaged operating state to a disengaged operating state. The central release mechanism can have a ring-shaped central release mechanism piston or several central release mechanism pistons (multi-piston release mechanisms).

The hydraulic assembly further has a first and a second clutch device. The clutch device can be designed, for example, as a disc clutch, multiple disc clutch, toothing clutch, or the like. The clutch device can also be configured as a brake, for example by the inner or outer discs of a multiple disc clutch being fixed in a non-rotatable manner with respect to the axle drive housing.

The central release mechanism can be configured in such a way that the first central release mechanism piston can be actuated independently of the second central release mechanism piston. However, it is preferred that both central release mechanism pistons are actuated synchronously.

The first central release mechanism piston preferably interacts with the clutch device, so that a movement of the first central release mechanism piston causes the first clutch device to be engaged or disengaged. The second central release mechanism piston preferably interacts with the second clutch device in an analogous manner, so that a movement of the second central release mechanism piston causes the second clutch device to be engaged or disengaged.

According to an advantageous embodiment, the first central release mechanism piston and the second central release mechanism piston can be movable in the axial direction. According to a further preferred further development, the first central release mechanism piston and the second central release mechanism piston can be movable in opposite directions from one another. In this way, particularly space-saving embodiments of an axle drive train can be implemented.

Furthermore, according to a likewise advantageous embodiment, the central release mechanism housing can have a double-T-shaped contour in cross-section, which is particularly favorable in terms of manufacturing technology.

According to a further particularly preferred embodiment, the central release mechanism housing can have a cylindrical ring-like spatial shape, which can also contribute to a compact design of the axle drive train.

Furthermore, the disclosure can also be further developed in such a way that a plurality of cylinder ring segment-like toothing elements are distributed over the circumference of the central release mechanism housing. The advantage of this design is that, in particular, the plurality of the toothing elements can be arranged in a simple manner over the circumference of the central release mechanism housing.

In a likewise preferred embodiment variant, at least two, preferably at least three, very particularly preferably at least four toothing elements can be present, wherein the toothing elements are formed to be essentially identical, whereby the manufacturing costs can be further optimized due to a reduction in component variance and larger batch sizes.

It can also be advantageous to further develop the disclosure in such a way that the toothing element, one of the toothing elements or all of the toothing elements is/are formed from a material different from the central release mechanism housing. According to a further preferred embodiment of the subject matter disclosed herein, the toothing element can, in this context, be formed from a metallic material, in particular steel, and the central release mechanism housing can be formed from aluminum or a plastic, in particular a fiber-reinforced plastic.

Finally, the disclosure can also be advantageously implemented in such a way that an axially fixed securing ring which is axially fixed relative to the drive train housing rests on at least one axial end face of the outer toothing.

BRIEF DESCRIPTION OF THE DRAWINGS

The disclosure will be explained in more detail below with reference to figures without limiting the general concept of the disclosure.

In the Figures.

DETAILED DESCRIPTION

Figure 1:
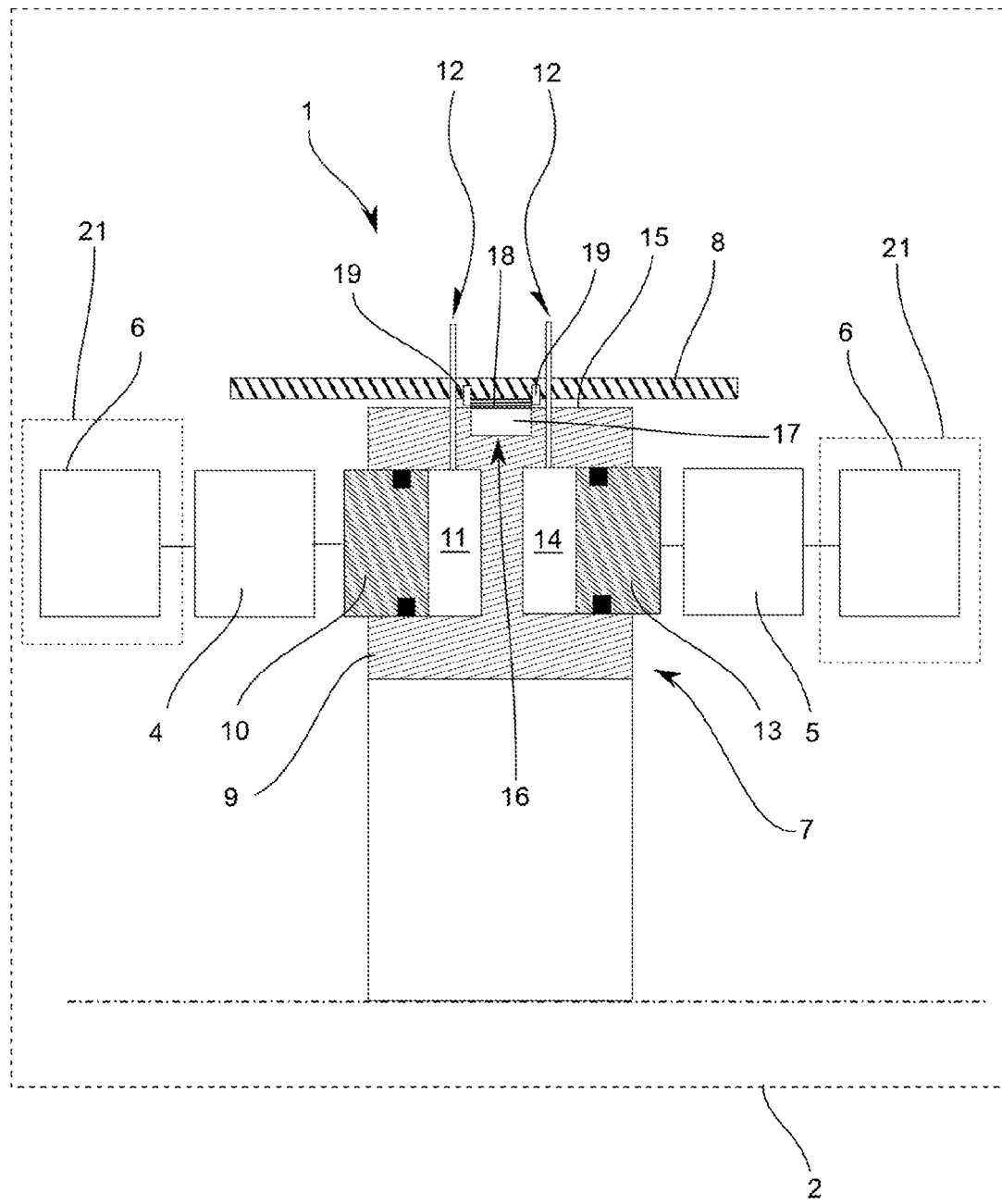
FIG. 1 shows a hydraulic assembly in a schematic axial sectional view.
Figure 4:
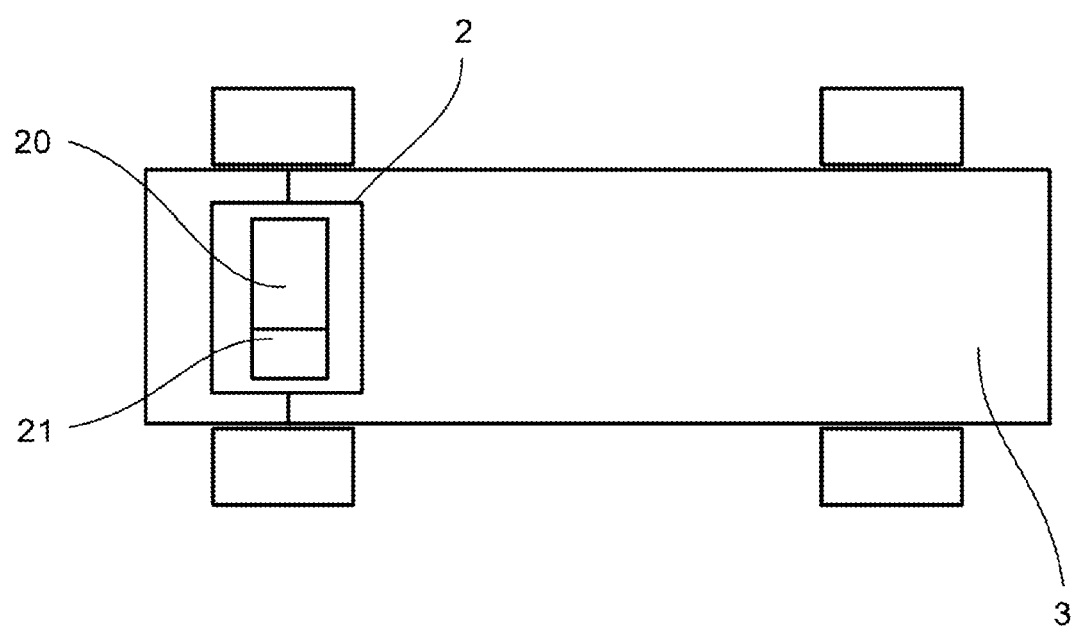
FIG. 4 shows a motor vehicle having an electrically operable axle drive train in a schematic block diagram.

FIG. 1 shows a hydraulic assembly 1 for an electrically operable, multi-gear axle drive train 2 of a motor vehicle 3, as is also shown in an exemplary manner in FIG. 4. The axle drive train 2 has an electric machine 20 and a multi-gear, shiftable transmission arrangement 21, which are enclosed by a common drive train housing 8.

The hydraulic assembly 1 has a first clutch device 4 and a second clutch device 5 for actuating at least one gear selection device 6 of the electrically operable axle drive train 2.

Furthermore, the hydraulic assembly 1 comprises a central release mechanism 7 with a first central release mechanism piston 10 that can be moved relative to a central release mechanism housing 9, which is fixed in a non-rotatable manner to a drive train housing 8, in a translational manner. A first pressure chamber 11 is defined between the central release mechanism housing 9 and the first central release mechanism piston 10, into which a hydraulic fluid 12 can be introduced and pressurized in such a way that the first central release mechanism piston 10 can be moved in a hydraulically effected manner in relation to the central release mechanism housing 9.

A second central release mechanism piston 13 that can be moved in a translational manner is provided in the central release mechanism housing 9, which is fixed in a non-rotatable manner to the drive train housing 8, wherein a second pressure chamber 14 is defined between the central release mechanism housing 9 and the second central release mechanism piston 13, into which the hydraulic fluid 12 can also be introduced and pressurized in such a way that the second central release mechanism piston 13 can be moved in a hydraulically effected manner in relation to the central release mechanism housing 9.

It can also be seen from FIG. 1 that the first central release mechanism piston 10 and the second central release mechanism piston 13 are axially movable in opposite directions from one another.

The central release mechanism pistons 10,13 are each operatively connected to a clutch device 4,5, so that an axial movement of a central release mechanism piston 10,13 causes an engagement or disengagement of the corresponding clutch device 4,5. In the exemplary embodiment shown, the clutch devices 4,5 are designed as brakes, which interact with the gear selection device 6 of a shiftable transmission arrangement 21, so that a gear change in the shiftable transmission arrangement 21 is effected by engaging or braking or disengaging or releasing the brake.

The central release mechanism housing 9 has a groove 16 on the radially outer lateral surface 15 thereof, into which multiple shell-like toothing elements 17 with an outer toothing 18 are inserted and are connected to the groove 16 in an axially secured and torque-transmitting manner. The outer toothing 18 engages in a corresponding toothing formed in a non-rotatable manner with respect to the drive train housing 8. The outer toothing 18 and the corresponding toothing of the drive train housing 8 form a spline so that the central release mechanism housing 9 can be inserted into the drive train housing 8 from the axial direction. For axial securing, an axially fixed securing ring 19 each which is axially fixed relative to the drive train housing 8 rests on both axial end faces of the outer toothing 18.

Figure 2:
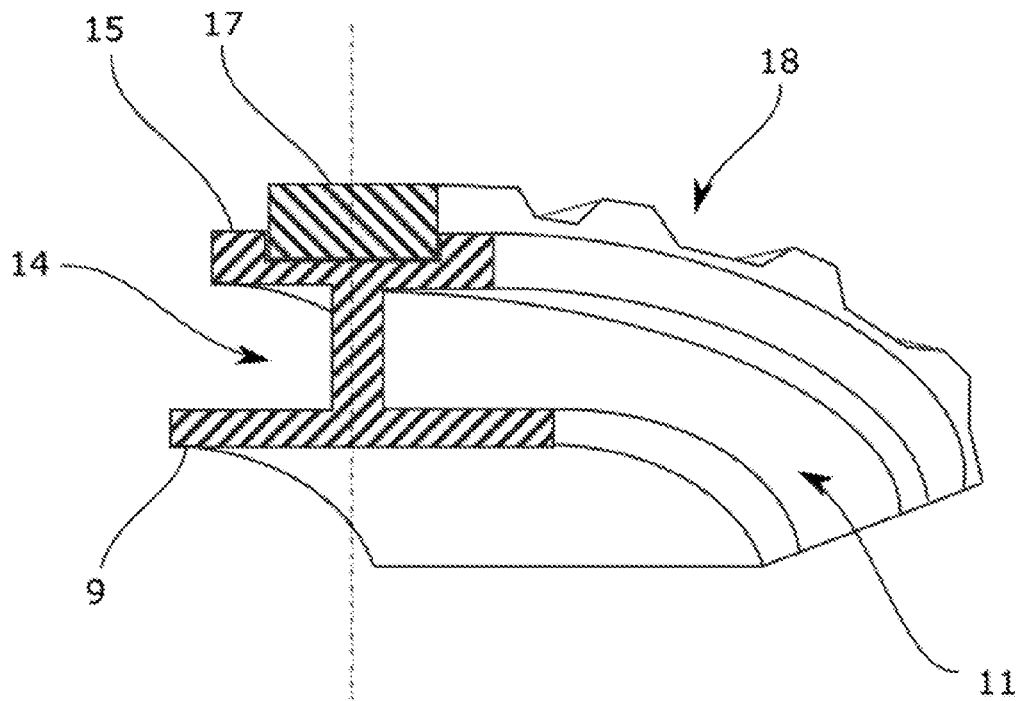
FIG. 2 shows an isolated central release mechanism housing in a perspective axial sectional view.

As shown in FIG. 2, the central release mechanism housing 9 has a double-T-shaped contour in cross-section, wherein the central release mechanism housing 9 has a cylindrical ring-like spatial shape.

Figure 3:
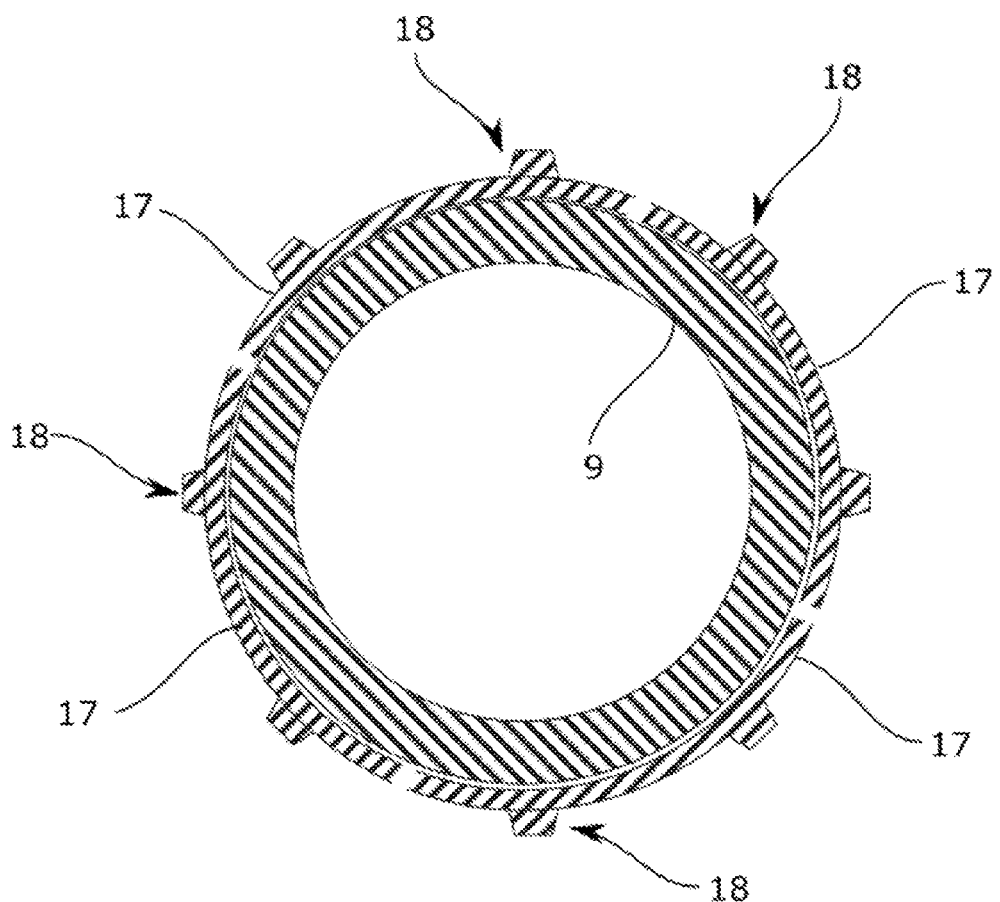
FIG. 3 shows a central release mechanism housing in a schematic cross-sectional view.

It can be seen from FIG. 3 that a plurality of cylinder ring segment-like toothing elements 17 are distributed over the circumference of the central release mechanism housing 9. In the embodiment shown, four toothing elements 17 are present, wherein the toothing elements 17 are formed to be essentially identical. All toothing elements 17 are formed from a material different from the central release mechanism housing 9.

In the exemplary embodiment of FIGS. 1-3, the toothing element 17 is formed from steel and the central release mechanism housing 9 is formed from aluminum or a plastic.

The disclosure is not limited to the embodiments shown in the figures. The above description is therefore not to be regarded as limiting, but rather as illustrative. The following claims are to be understood as meaning that a named feature is present in at least one embodiment disclosed herein. This does not exclude the presence of further features. If the claims and the above description define 'first' and 'second' features, this designation serves to distinguish between two features of the same type without defining an order of precedence.

LIST OF REFERENCE SYMBOLS

1 Hydraulic assembly
2 Axle drive train
3 Motor vehicle
4 Clutch device
5 Clutch device
6 Gear selection device
7 Central release mechanism
8 Drive train housing
9 Central release mechanism housing
10 Central release mechanism piston
11 Pressure chamber
12 Hydraulic fluid
13 Central release mechanism piston
14 Pressure chamber
15 Lateral surface
16 Groove
17 Toothing element
18 Outer toothing
19 Securing ring
20 Electric machine
21 Transmission arrangement

The invention claimed is:

1. A hydraulic assembly for an electrically operable, multi-gear axle drive train of a motor vehicle, the hydraulic assembly comprising
a first clutch device; and
a second clutch device
for actuating at least one gear selection device of the electrically operable axle drive train;
a central release mechanism
with a first central release mechanism piston that is movable relative to a central release mechanism housing, which is fixed non-rotatably to a drive train housing, in a translational manner, wherein a first pressure chamber is defined between the central release mechanism housing and the first central release mechanism piston, into which a hydraulic fluid is introducible and pressurized such that the first central release mechanism piston is moved hydraulically in relation to the central release mechanism housing, and
with a second central release mechanism piston that is movable relative to the central release mechanism housing, which is fixed non-rotatably to the drive train housing, in a translational manner, wherein a second pressure chamber is defined between the central release mechanism housing and the second central release mechanism piston, into which the hydraulic fluid is introducible and pressurized such that the second central release mechanism piston is moved hydraulically effected manner in relation to the central release mechanism housing;
the central release mechanism housing has a groove on a radially outer lateral surface thereof, into which a ring segment-shaped toothing element with an outer toothing is inserted and is connected axially secured and for torque-transmission, wherein the outer toothing engages in a corresponding toothing formed non-rotatably with respect to the drive train housing.

2. The hydraulic assembly according to claim 1, wherein the first central release mechanism piston and the second central release mechanism piston are movable in the axial direction.

3. The hydraulic assembly according to claim 1, wherein the first central release mechanism piston and the second central release mechanism piston are movable in opposite directions from one another.

4. The hydraulic assembly according to claim 1, wherein the central release mechanism housing has a double-T-shaped contour in cross-section.

5. The hydraulic assembly according to claim 1, wherein the central release mechanism housing has a cylindrical ring-shaped spatial shape.

6. The hydraulic assembly according to claim 1, wherein a plurality of the ring segment-shaped toothing elements are distributed over a circumference of the central release mechanism housing.

7. The hydraulic assembly according to claim 6, wherein at least two of the toothing elements are present, and the toothing elements are formed to be essentially identical.

8. The hydraulic assembly according to claim 1, wherein the toothing element is formed from a material different from the central release mechanism housing.

9. The hydraulic assembly according to claim 1, wherein the toothing element is formed from a metallic material, and the central release mechanism housing is formed from aluminum or a plastic.

10. The hydraulic assembly according to claim 1, further comprising
an axially fixed securing ring which is axially fixed relative to the drive train housing rests on at least one axial end face of the outer toothing.

11. A hydraulic assembly for an electrically operable, multi-gear axle drive train of a motor vehicle, the hydraulic assembly comprising
a first clutch device;
a second clutch device for actuating at least one gear selection device of the electrically operable axle drive train;
a central release mechanism including a first central release mechanism piston that is movable relative to a central release mechanism housing, which is fixed non-rotatably to a drive train housing, a first pressure chamber between the central release mechanism housing and the first central release mechanism piston, into which a hydraulic fluid is introducible for movement of the first central release mechanism piston in relation to the central release mechanism housing, and a second central release mechanism piston that is movable relative to the central release mechanism housing, and a second pressure chamber between the central release mechanism housing and the second central release mechanism piston, into which the hydraulic fluid is introducible for movement of the second central release mechanism piston in relation to the central release mechanism housing; and
the central release mechanism housing has a groove on a radially outer lateral surface thereof, into which a toothing element with an outer toothing is inserted and is connected axially secured and for torque-transmission, and the outer toothing engages in a corresponding toothing formed non-rotatably with respect to the drive train housing.

12. The hydraulic assembly according to claim 11, wherein the first central release mechanism piston and the second central release mechanism piston are movable in the axial direction.

13. The hydraulic assembly according to claim 11, wherein the first central release mechanism piston and the second central release mechanism piston are movable in opposite directions from one another.

14. The hydraulic assembly according to claim 11, wherein the central release mechanism housing has a double-T-shaped contour in cross-section.

15. The hydraulic assembly according to claim 11, wherein the central release mechanism housing has a cylindrical ring-shaped spatial shape.

16. The hydraulic assembly according to claim 11, wherein the toothing element comprises a plurality of ring segment-shaped toothing elements that are distributed over a circumference of the central release mechanism housing.

17. The hydraulic assembly according to claim 16, wherein at least two of the toothing elements are present, and the toothing elements are formed to be essentially identical.

18. The hydraulic assembly according to claim 11, wherein the toothing element is formed from a material different from the central release mechanism housing.

19. The hydraulic assembly according to claim 11, wherein the toothing element is formed from a metallic material, and the central release mechanism housing is formed from aluminum or a plastic.

20. The hydraulic assembly according to claim 11, further comprising an axially fixed securing ring which is axially fixed relative to the drive train housing rests on at least one axial end face of the outer toothing.

* * * * *